(12) United States Patent
Curd et al.

(10) Patent No.: US 9,727,878 B2
(45) Date of Patent: Aug. 8, 2017

(54) MAXIMIZING ADVERTISING PERFORMANCE

(75) Inventors: Ian Curd, Christchurch (NZ); Ian Kilday, Christchurch (NZ); Richard Atkin, Christchurch (NZ)

(73) Assignee: iHeartMedia Management Services, Inc., San Antonio, TX (US)

( * ) Notice: Subject to any disclaimer, the term of this patent is extended or adjusted under 35 U.S.C. 154(b) by 2392 days.

(21) Appl. No.: 12/417,632

(22) Filed: Apr. 3, 2009

(65) Prior Publication Data

US 2009/0254420 A1    Oct. 8, 2009

Related U.S. Application Data

(60) Provisional application No. 61/064,916, filed on Apr. 3, 2008.

(51) Int. Cl.
*G06Q 30/02* (2012.01)
(52) U.S. Cl.
CPC ......... *G06Q 30/02* (2013.01); *G06Q 30/0201* (2013.01); *G06Q 30/0242* (2013.01)
(58) Field of Classification Search
CPC .................................................. G06Q 30/0241
USPC ...................................................... 705/14.41
See application file for complete search history.

(56) References Cited

U.S. PATENT DOCUMENTS

| | | | |
|---|---|---|---|
| 6,286,005 B1* | 9/2001 | Cannon | 455/2.01 |
| 8,140,389 B2* | 3/2012 | Altberg | G06Q 30/02 |
| | | | 379/900 |
| 2003/0074252 A1* | 4/2003 | Chandler-Pepelnjak et al. | 705/10 |
| 2004/0268387 A1* | 12/2004 | Wendling | 725/35 |
| 2006/0293974 A1* | 12/2006 | Lewis | G06Q 10/06 |
| | | | 705/27.1 |
| 2007/0136753 A1* | 6/2007 | Bovenschulte et al. | 725/46 |
| 2007/0208621 A1* | 9/2007 | Park et al. | 705/14 |
| 2007/0239536 A1* | 10/2007 | Bollapragada | 705/14 |

* cited by examiner

*Primary Examiner* — Lindsay M Maguire
*Assistant Examiner* — Cho Kwong
(74) *Attorney, Agent, or Firm* — Garlick & Markison; Edward J. Marshall

(57) ABSTRACT

Multiple filtering criteria derived from consumer surveys can be used to adjust an advertising schedule to achieve improved performance. Historical performance data related to performance factors, such as gross rating points, can be filtered using the multiple filtering criteria. The filtered data can then be used as the basis for predicting future performance of an advertisement or advertising campaign. The historical data can be updated as new performance data becomes available, and the predicted future performance updated. An advertising schedule can be adjusted to maintain performance factors within designated upper and lower limits.

12 Claims, 6 Drawing Sheets

| Spots | Avails | Rates | | | | | | | | | | | | | | | | | | | | | | | | | | | | | | Weekday GRP 75% | Weekend GRP 25% | | | Daypart GRP% |
|---|---|---|---|---|---|---|---|---|---|---|---|---|---|---|---|---|---|---|---|---|---|---|---|---|---|---|---|---|---|---|---|---|---|---|---|---|
| Timezone | 1 M | 2 T | 3 W | 4 T | 5 F | 6 S | 7 S | 8 M | 9 T | 10 W | 11 T | 12 F | 13 S | 14 S | 15 M | 16 T | 17 W | 18 T | 19 F | 20 S | 21 S | 22 M | 23 T | 24 W | 25 T | 26 F | 27 S | 28 S | 29 M | 30 T | 31 W | Total Sports | Gross Line Amount | Rate | GRP | GRP% |
| PPMEARLY | | | | 1 | | | | | | | | | | 1 | | | | | | | 1 | | | | | | | | 1 | | | 4 | 30.06 | 5.50 | 5.4685 | 5% |
| PPM6-7 | | | | | | | | | | | | | | | | | | | | | 1 | | | | | | | | | | | 1 | 54.73 | 18.00 | 3.0403 | |
| PPM7-8 | | | | | 1 | | | | | | | | | | | | | | | | 1 | | | | | | | | | | | 1 | 244.41 | 25.00 | 9.7765 | |
| PPM8-9 | | | | | | | | | | | | | | | | | | | | | | | | | | | | | | | | 0 | 0.00 | 0.00 | 0.0000 | 79% |
| PPM9-10 | | | | 1 | | | | | | 1 1 | | | | | | | | | | | | | | | | | | | | | | 3 | 451.81 | 20.00 | 22.5900 | |
| PPM10-11 | | | | | | | | | | | | | | | | 1 | | | | | | | | | | | | | | | | 1 | 91.12 | 16.00 | 5.6950 | |
| PPM11-12 | | | | | | | | 1 | | | | | | | | | | | | | | | | | | | | | | | | 1 | 102.95 | 18.00 | 5.7194 | |
| PPM12-13 | | | | | | | | | | | | | | | | | | | | | | | 1 1 | | | | | | | | | 2 | 167.69 | 16.00 | 10.4810 | |
| PPM13-14 | | | | | | | | | | | | | | | | | | | | | | | | | | | | | | | | 0 | 0.00 | 0.00 | 0.0000 | |
| PPM14-15 | | | | | | | 1 | | | | | | | 1 | | | | | | | | | | | | | | | | | | 2 | 175.57 | 15.00 | 11.7715 | |
| PPM15-16 | | | | | | | | 1 | | | | | | | | | | | | | | | | | | | | | | 1 | | 1 | 88.71 | 15.00 | 5.9140 | |
| PPM16-17 | | | | | | | | | | | | | | | | | | | | | | | | | | | | | | 1 | | 1 | 85.73 | 17.00 | 5.1015 | |
| PPM17-18 | | | | | | | | | | | | | | | | | | | | | | | | | | | | | | | | 0 | 0.00 | 0.00 | 0.0000 | |
| PPM18-19 | | | | | | | | | | | | | | | | | | | | | 1 | | | | | | | | | | | 1 | 49.62 | 15.00 | 3.3083 | |
| PPM19-20 | | | | | | | | | | | | | | | | | | | | | | | | | | | | 1 | 1 | | | 2 | 46.62 | 12.00 | 3.8849 | 9% |
| PPM20-21 | | | | | | | | | | | | | | | | | | | | | | | | | | | | 1 | | | | 1 | 16.40 | 12.00 | 1.3663 | |
| PPM21-22 | | | | | | | | | | | | | | | | | | | | | | | | | | | | 1 | | | | 1 | 13.07 | 12.00 | 1.0893 | 7% |
| PPM22-23 | | | | | | | | | | | | | | | | | | | | | | | | | | | | | | | | 0 | 0.00 | 0.00 | 0.0000 | |
| PPM23-24 | | | | | | | 1 | | | | | | | | | | | | | | | | | | | | | 1 | | | | 2 | 55.40 | 10.00 | 5.5398 | |
| | 1 M | 2 T | 3 W | 4 T | 5 F | 6 S | 7 S | 8 M | 9 T | 10 W | 11 T | 12 F | 13 S | 14 S | 15 M | 16 T | 17 W | 18 T | 19 F | 20 S | 21 S | 22 M | 23 T | 24 W | 25 T | 26 F | 27 S | 28 S | 29 M | 30 T | 31 W | 24 | 1675.91 | 16.53 | 100.7473 | |

FIG. 5

MAXIMIZING ADVERTISING PERFORMANCE

RELATED APPLICATIONS

This application claims the benefit of Provisional Application No. 61/064,916, filed Apr. 3, 2008, and entitled "SYSTEMS AND METHODS FOR PREDICTING AND ACHIEVING REQUIRED LEVELS OF ADVERTISING PERFORMANCE."

FIELD

The present disclosure relates generally to multimedia, and more particularly to providing content related to commercial media programs.

BACKGROUND

Generally, advertisers want their advertising to reach a specific number of people in a specific demographic category. Often, this number is defined in a contract for the purchase of a requirement of their contract to purchase advertising space with a media outlet. Gross Rating Points (GRP) is one metric utilized to measure advertising performance that results from an advertising campaign. GRP can be defined as a rating achieved by a specific advertising campaign. Use of performance metrics such as GRP assures the advertiser that its advertising will reach a specified number or people in a targeted demographic. GRP also allows an advertiser to compare the effectiveness of its advertising dollars from different media outlets. From the perspective of the advertising media outlet (e.g., television station, radio station, Internet etc.), the media outlet can price its advertising inventory based on a GRP (or other, similar metric) rate rather than a spot rate.

Current techniques that allow radio station and the advertiser to predict GRP performance for an advertising campaign can be cumbersome to implement, and are therefore somewhat less than perfect.

SUMMARY

Historic data regarding gross rating points or other performance criteria related to advertising parameters can be stored. Multiple filtering criteria related to a consumer survey can be specified, and used to filter the historic data. In some embodiments, user input relating to consumer demographic information; is received, and the filtering criteria can be set or adjusted based on the user input. In some embodiments, only two filtering criteria are used. Using the filtered historic data and the advertising parameters (time station etc), a predicted gross rating point value for a proposed advertisement can be generated. The predicted gross rating point value can be updated, either periodically or in response to receiving new historical data, and an updated predicted gross rating point value can be generated to reflect the new data. In some embodiments, an advertising schedule can be continually adjusted to maintain the predicted gross rating point value between upper and lower boundary values.

Various embodiments provide a web page to display a plurality of day-time combinations according to selectable scheduling criteria. The web page can display a predicted gross rating point value for advertisements scheduled to be run at particular day-time combinations. One or more additional advertisements can be added at particular day-time combinations, and the displayed prediction of advertising performance can be updated accordingly.

In some embodiments, one or more contracts and a plurality of unscheduled advertisements are provided. Each of the plurality of advertisements is associated with one of one or more contracts, each of which can have a performance contractual value and a contract performance value. The contract performance value of each contract can be related to an advertisement performance value, which is in turn can be associated with the individual advertisements that are part of a contract. One or more scheduling parameters, which can include a station identifier and a date, are selected, and advertisements can be automatically scheduled based on the performance contractual value and the contract performance value.

Scheduling the advertisements can include obtaining demographic information related to a consumer survey, establishing multiple criteria based on the demographic information, selecting an advertisement to be scheduled, identifying one or more valid advertisement breaks for the next advertisement and scoring each one of the one or more valid advertisement breaks. If a contract associated with an advertisement is under-performing, that advertisement can be scheduled in a valid advertisement break based on the scoring, in an attempt to improve the performance of the advertisement in accordance with the contract. In some embodiments, the advertisement break selected can have the highest ratings score based on the plurality of criteria.

Furthermore, the advertisement can be assigned to an advertisement break based one or more selectable scheduling parameters, such as a time period. Various scheduling tasks can be performed recursively, so that the total predicted performance value can be maintained within with a predicted performance value for the next advertisement. Additionally, some embodiments include generating a proposed advertising schedule based on the total predicted performance value and the performance contractual value.

Various embodiments can be implemented as a computer readable medium tangibly embodying a program of computer executable instructions. Furthermore, in some instances the technology disclosed herein can be implemented as a system including memory, and a processor or other circuitry configured to execute a program of instructions.

DESCRIPTION OF THE DRAWINGS

The detailed description will refer to the following drawings, wherein like numerals may refer to like elements, and wherein:

FIG. 5 is a diagram illustrating a web-form utilized by an embodiment of a method for entering an advertising lay-down into a web browser and estimating the GRP to be achieved from this lay-down in real-time.

DETAILED DESCRIPTION

Figure 1:
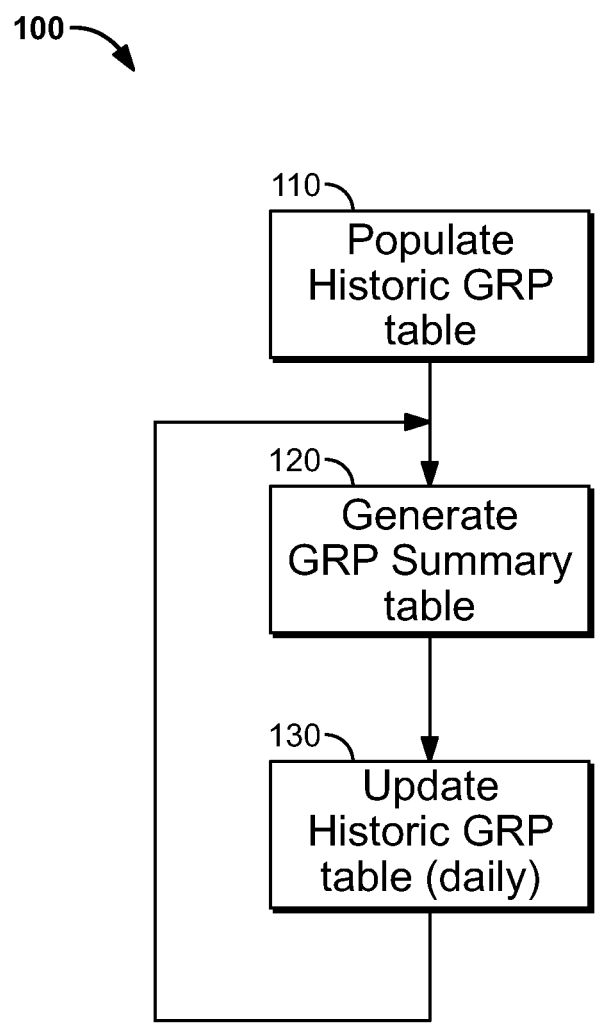
FIG. 1 is a flowchart illustrating an embodiment of a method for predicting gross rating points.

Described herein include systems, software and methods for predicting and achieving contractual levels of advertising performance. Some embodiments discussed herein predict or achieve contractual levels of gross rating points (GRP). It is understood that other metrics know to those of ordinary skill in the art for measuring levels of advertising performance may be used in place of GRP in the embodiments described herein.

A gross rating point can be defined as a unit of measurement of advertising audience size equal to one percent of the total potential audience universe. It can be utilized to measure the exposure of one or more programs or commercials without regard to multiple exposure of the same advertising to individuals. Thus, a GRP can be the product of media reach multiplied by exposure frequency. Media reach can be defined as the total number of individual prospects exposed to the advertisement and is usually stated as a percentage of the target market. Exposure frequency is related to the number of exposures an advertisement receives in the target market or demographic. The GRP may include duplicate exposure, where the same listener hears the same advertisement at different times. Generally, a spot is an advertisement having a defined time or other segment of content played on a media outlet such as a radio station. A GRP metric may not reveal how often each listener heard the same spot (frequency) or the number of unduplicated listeners that heard the same spot (reach).

GRP, for a radio station, can indicate the percentage of the population that is listening to the advertisement at any instance of time. A GRP of one (1) represents 1% of a target demographic, and 100.0 GRP represents 100% of the demographic. GRP can be calculated for each minute of each day and there could be audience duplication over the course of a contract. Therefore a GRP of over 100% can be provided for a particular contract.

Advertisement listener data provided by many monitoring methods and agencies can be utilized to calculate GRP. One such method utilizes a Portable People Meter (PPM) device that provides listening activity data to agencies such as TSN Gallup, Nielson, BBM, etc. A PPM is an electronic device advertisement is typically worn by members of the radio listening public and it records what a sample group of people are listing to at any given time. The PPM and other related devices can log and store data regarding radio listenership for each minute of the day and this data can be uploaded to a monitoring entity such TSN Gallup on a daily basis where the data can be pooled in a central database. Each person with a PPM device can be assigned a weighting that relates to the percentage of the total population that he or she represents. This weighting can be from between 0 and 100. The PPM data can then be purchased by subscribing radio stations for use in accurately tracking the listening habits of their audience and can provide GRP data. PPM data can provide minute-by-minute data regarding both the listening habits and demographic information of PPM participants.

The system and methods described herein may be implemented as part of a system that schedules media content such as, by way of example, the Airwaves Traffic software suite that is commercially available from Radio Computing Services, Inc. Airwaves Traffic software can control the scheduling of advertisements and related invoicing functions, provide sales and revenue projection reports, and can manage clients and client contacts for multiple stations in multiple time zones. Airwaves Online services is a web-based service that allows advertising account managers to view inventory of media outlets such as radio stations and available time slots, and allows users to track historical performance of advertising campaigns and allows users to predict impact (listenership), and to create proposals, to plan campaigns, to schedule and to automatically implement an "advertising lay-down." "Advertising lay-down" can be defined as the scheduling of advertising spots over a time-period (e.g., a day-part, day, days, week, etc.) on one or more stations and/or media outlets.

Airwaves Traffic software is generally a suite of software application that can run on a server component and work station components operating under, e.g., a Windows Vista, 2003, 2000, XP, Linux, Mac, Solaris etc operating system. In some embodiments, Microsoft SQL Server 2005 is used to support the Airwaves Traffic software suite databases and Microsoft Office and Microsoft Outlook can also be utilized. In some embodiments, the Airwaves Traffic suite can execute code written in MFC (C++) language and the Airwaves Online suite can execute code written in C# language.

The Airwaves Traffic suite can calculate GRP for a past spots, by utilizing impacts and population data for the spot's specific demographic. Impacts, impressions, or the number of people assumed to have heard the spot can be divided by the population in range of a transmission, to provide a percentage of PPM listeners matching the demographic who heard the spot. Impacts generally are the number of actual listeners estimated to have heard the spot. Impacts can be calculated by multiplying the weighting of each PPM user by 1000. For example if a PPM participant with a weighting of 8.6957 listens to a spot, then it can be estimated that the spot received 8695 impacts based on that participant hearing the spot. It can be appreciated that that the impacts achieved over the course of a contract can include audience duplication, as the same participant may hear multiple spots for the same contract. In some embodiments, audience duplication can have associated weighting. Research has shown that when that same listener hears a spot repeatedly it improves the overall effectiveness of the spot or response to an advertisement up to a point, at which point saturation is reached. After saturation, the effectiveness can degrade (e.g., hearing once is good, hearing twice is better, hearing three times is best, but hearing four times can be a wasted advertisement resources). The weighting based on audience duplication can utilize this scale and weights impacts for most effective delivery of an advertisement. Population can be calculated by adding the weightings of all PPM participants together. In some embodiments, only the PPM participants matching the demographic are added together when calculating GRP for a spot With reference now to FIG. 1, a method 100 for predicting impact using gross rating points (GRP) is illustrated. As illustrated by block 110 a Historic GRP table is depicted, populated with historical GRP data, which can include data obtained from a consumer survey. In some embodiments, the table can provide actual GRP data (if available) for each station, demographic, day of week (Mon-Sun), and minute of the day (i.e., 1 to 1440). Historical GRP data can be calculated from data acquired from actual listening habits of people such as the data obtained from PPM users. The Historic GRP table can include at least five (5) week's worth of historical GRP data.

In some embodiments, the Historical GRP data can be filtered, using the demographic or other information obtained from a consumer survey, to generate a filtered set of historic data. As used herein, the term Historical GRP data can include filtered Historic GRP data. Furthermore, multiple demographic filters can be provided, for example, Age+Gender, Age+Car, Age+Shopper, or the like. Some embodiments limit the number of demographic filters to two, to ensure a statistically sufficient sample size and prevent a need for additional sample-size validation.

Figure 6:
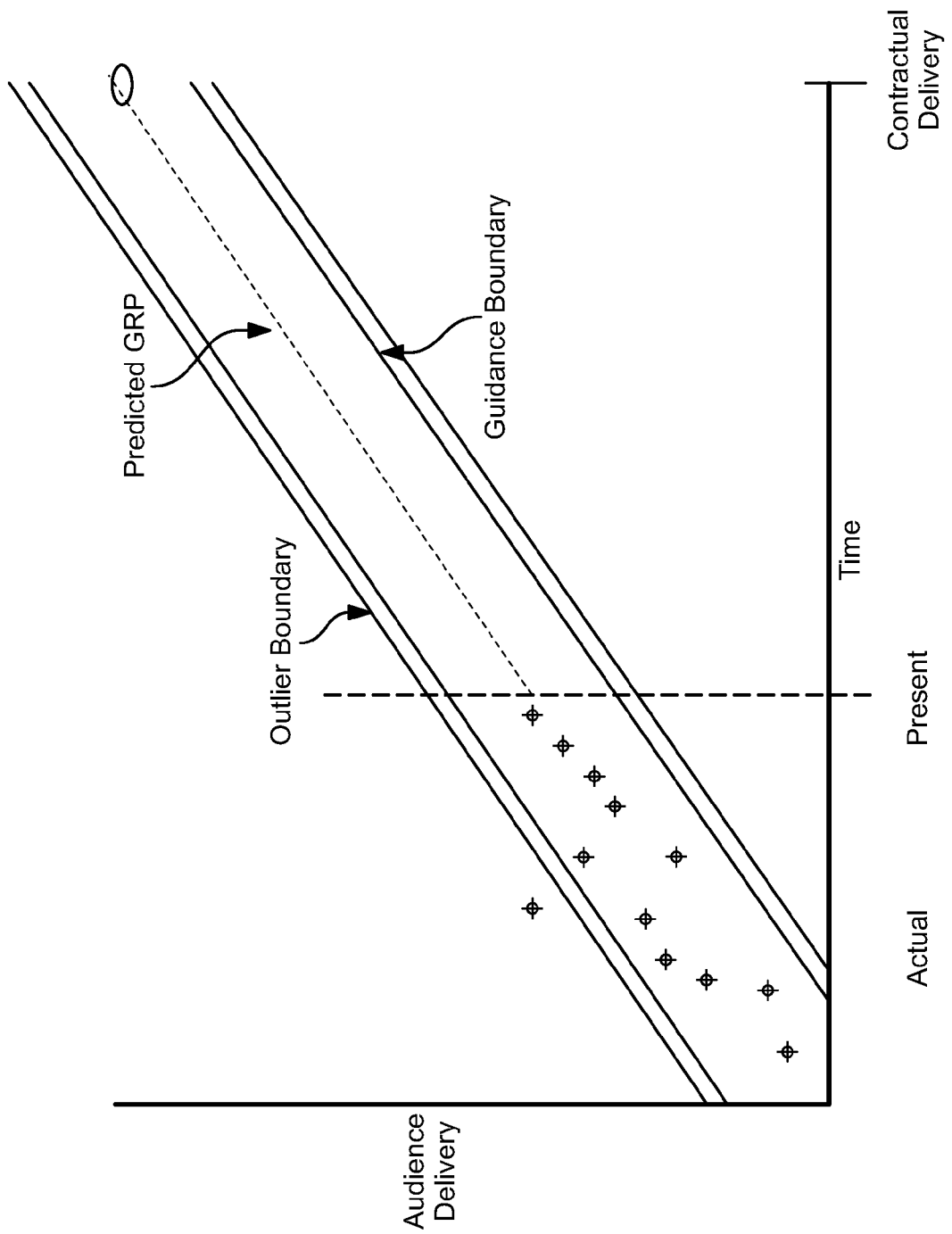
FIG. 6 is a diagram illustrating guidance lanes.

As illustrated by block 120, a GRP Summary table that can summarize and trend historical GRP data can be generated by storing one predicted GRP value for every combination of, e.g., station, demographic, and day of week (Mon to Sun). Trend data based on historical GRP may be determined by trending algorithms. Some embodiments may use a feature called "guidance lanes," to determine trends. An example of guidance lanes and their usage is shown in FIG. 6 and discussed below. A predicted GRP value can be determined by averaging matching historic GRP combinations for, e.g., the previous five (5) weeks, for each combination of station, demographic, and day of week. If historic GRP cannot be located, Historic GPR can be excluded from the average. This process can be repeated for every combination of station, demographic, day of the week etc As illustrate by block 130, the Historical GRP table can be updated with more current GRP data, for example on a daily basis, but in some embodiments at other intervals. For example, the updating can occur on a substantially continual basis, or be performed periodically at intervals other than daily. This update feature can be a user selectable feature. After the Historical GRP table is updated as illustrated by block 130, a summary in accordance block 120 can be performed again, i.e., the GRP Summary table is updated with new GRP predictions based on the updated historical data.

The GRP Summary table can be used in preparing a proposal to an advertiser where the proposal can predict how much GRP will be achieved by a particular series of advertisements. It can be appreciated that in some embodiments performance metrics other than GRP (e.g., WAVE, Impacts or Impressions) may be used to predict and measure impact or advertising performance. For example, Bayesian regression, Linear Regression, etc may be utilized to predict impact or advertising performance, instead of, or in cooperation with GRP advertisement in addition to station, demographic, day of week, and quarter hour may be utilized to record historical impact and predict impact, and that the look-back period for historical data could be more or less than five weeks.

An advertising contract often will designate a "Contractual GRP" value, which is the GRP that the contract is expected to achieve. The contractual GRP is normally specified by, or agreed upon between the seller of the inventory and the advertiser. The disclosed system allows the advertiser and the seller of the advertising to predict, plan, implement and monitor an advertising campaign for compliance with a target Contractual GRP value.

GRP Achieved" for logged and reconciled advertisements can be described as GRP from the minute the spot went to air. GRP Achieved can be based on actual data such as PPM data. The GRP provided and/or received via the contract can be evaluated as the GRP Achieved for each spot subject to the contract.

"GRP Scheduled" can be defined as future spots or spots that have aired in the past, but have not yet been logged and reconciled. The GRP Scheduled can be predicted based on a five week average of GRP Achieved and the GRP Scheduled can be averaged for each quarter hour of each day. The "GRP Estimated" can be defined as the total of GRP Achieved and GRP Scheduled for an entire contract. "GRP Difference" can be defined as a difference between the Contractual GRP and the GRP Estimated on a specific contract. The Airwaves suite of software advertisement can also take into account the GRP Difference and can schedule advertisements so that advertisements in underperforming contracts are moved such that they are scheduled in high-GRP spots or receiving breaks. Database tables or other storage structures can be utilized to store data for each advertisement and each contract and for the entire system. Each contract can have a Contractual GRP value or target associated with it. The disclosed arrangements can also tore a tolerance level, defining an extent to which the GRP Estimated is allowed to deviate from the Contractual GRP. It can be appreciated that an advertiser may pay more for a contract where the level of GRP or level of performance is guaranteed. The tolerance value can also be the same for all GRP contracts handled by the disclosed arrangements. In some embodiments the tolerance value can be set by default to 10%, and in some embodiments it can be adjusted higher or lower by a user.

Referring to FIG. 6, guidance lane embodiments are disclosed. A guidance lane can be a combination of correction points and data filtering that provides scheduling guidance such that a user can obtain a predicted GRP or a GRP goal. In some embodiments an estimated GRP goal can be calculated and plotted over time (e.g., a trending increase in GRP as shown in FIG. 6). Boundaries such as a Guidance Boundary and Outlier Boundary can be set on both sides of an estimated GRP value or GRP goal. The boundaries can be calculated based on empirical data (e.g., prior ratings and delivery data with weighted seasonal and market adjustments) for a particular market and station and can be adjusted. A guidance lane allows for linear regression to be applied to actual GRP values and allows for short-term corrections to adjust actual GRP values falling within a first set of guidance boundaries (the "Guidance Boundaries" in FIG. 6). Such a correction can be referred to as a nudge. Short-term corrections applied to adjust GRP values falling outside the first set of guidance boundaries but within the second set of guidance boundaries (the "Outlier Boundaries" in FIG. 6), can be referred to as "corrections." and noise elimination. Corrections and noise elimination can ignore actual GRP values ("Outliers") or values that fall outside of the second set of guidance boundaries. A control mechanism for scheduling spots can feed the "Nudges" and "Corrections" to adjust the spot schedules in order to ultimately meet the GRP goal.

Figure 2:
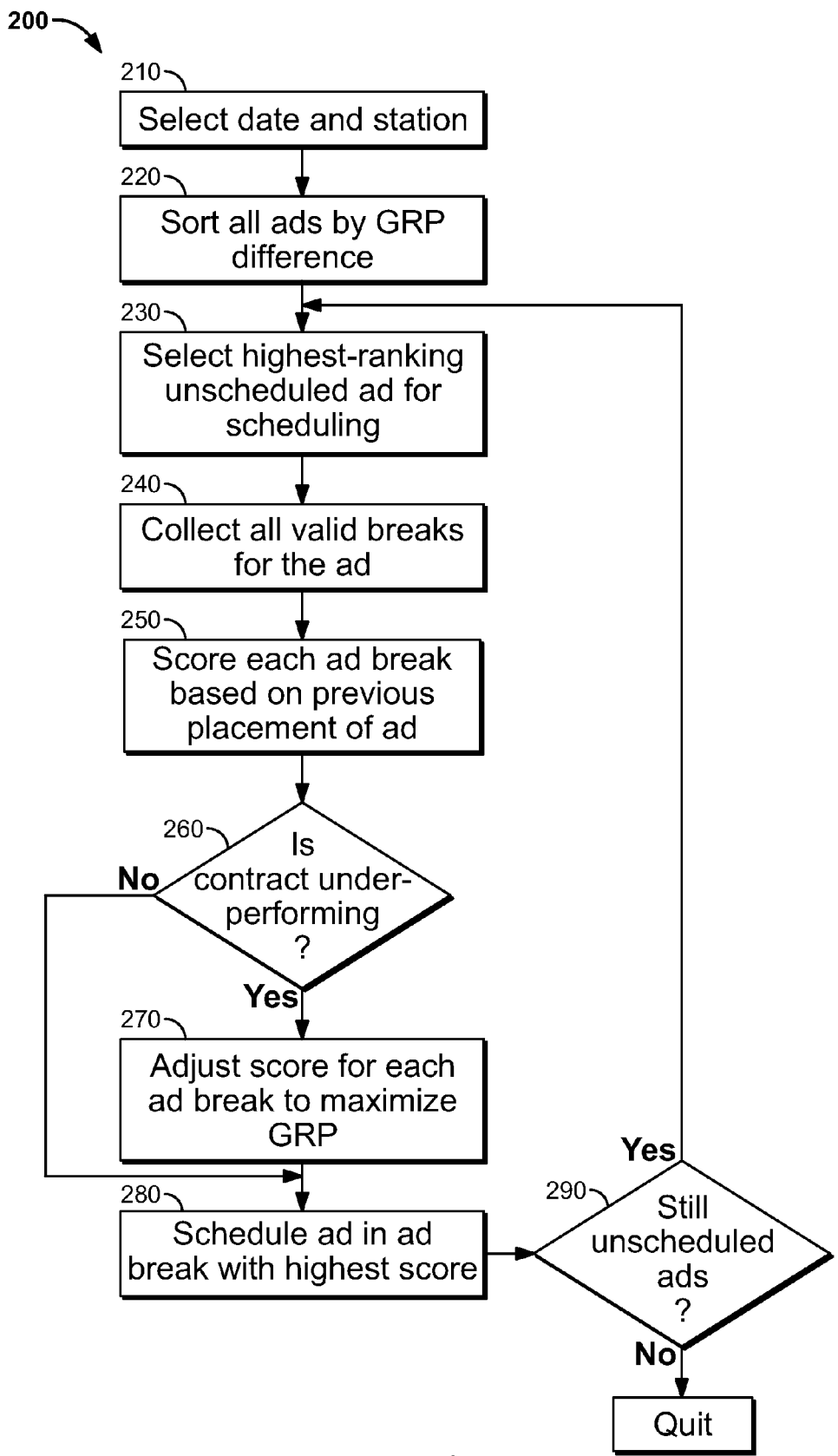
FIG. 2 is a flowchart illustrating an embodiment of a method for scheduling advertisements to achieve a contractual level of GRP.

With reference now to FIG. 2, a method 200 for scheduling advertisements to achieve a contractual level of GRP is illustrated. The method 200 can schedule advertisements to achieve a Contractual GRP value or can be utilized to schedule a particular date and station combination.

As illustrated by block 210, a station and date combination can be selected for an advertisement As illustrated by block 220, advertisements for the station and date combination can be sorted into an ordered list. The ordering, as illustrated by block 220, can be determined by a GRP Difference and a tolerance percentage for each advertisement. Advertisements which receive a highest ranking can be advertisements whose GRP Difference differs from a Contractual GRP by more than the tolerance percentage. The highest ranking advertisement can be the advertisement with the greatest GRP Difference.

The advertisements in the ordered list can be scheduled one at a time, beginning with the advertisement with the highest ranking. As illustrated by block 230, the highest-ranking unscheduled advertisement can be selected for scheduling.

Validity criteria rules that specify a validity of schedule placement can be associated with each advertisement spot. Some validity criteria can include day-part rules, i.e. what time during the day an advertisement could be played, and rules to prevent advertisement clashing, a mechanism to avoid situations where advertisements for similar or competing products run to close each other for example in the same advertisement break,. Overbooking rules can also be applied where advertising breaks can have parameters or settings that dictate a maximum duration and maximum number of spots. Thus, attempting to place a spot in a break that will or would not fit can cause overbooking (if one or more of the maximums are exceeded or conditions are not met). Day-part rules, overbooking and clashing can cause an invalidity flag and message to be generated advertisement. As illustrated by block 240, a collection of valid advertisement breaks can be formed by collecting advertisement breaks which are valid or alternatively "not invalid" based on validity criteria and/or previously-scheduled advertisements.

The database table associated with the advertisement can include GRP historical data about the advertisement including all previous dates and times each station has run the advertisement and the actual GRP achieved. As illustrated by block 250, each advertisement break in the collection of valid advertisement breaks can be scored according to how often the advertisement has played in a specific break in the past. Higher score are typically achieved to breaks and/or day parts in which the advertisement has not previously run.

Two values can be related to and possibly stored with each advertisement, the GRP Achieved and the GRP Scheduled. In some embodiments, only one of these values will be filled out. If the advertisement has played and its actual aired time has been reconciled the GRP Achieved value can be set, otherwise the GRP Scheduled value can be set. The total GRP Achieved and GRP Scheduled may also be stored at the contract level, which can be a sum of the GRP Achieved and GRP Scheduled values for all advertisements for a contract As illustrated by block 260, the GRP Estimated for an advertisement can be evaluated to determine if the contract is underperforming. If the contract is underperforming, e.g. if the GRP Achieved is lower than the Contractual GRP by more than the tolerance percentage, scores for the advertisement breaks can be further adjusted as illustrated by block 270. If the contract is not underperforming, the method can proceed to block 280.

If the system is not performing in accordance with the contractual requirements or the media outlet is is underperforming then as illustrated in block 270 the score of each advertisement break can be adjusted by a value based on the predicted GRP that would achieved the contractual obligation. The adjustment could be made by scheduling the advertisement in advertisement breaks that will likely achieve a higher GRP. The predicted GRP can be determined in accordance with FIG. 1. The scores of the advertisement breaks can be adjusted so that a higher predicted GRP can lead to a higher score for the advertisement break. Further the advertisement break with the highest predicted GRP can have the highest score.

As illustrated by block 280, the advertisement can be scheduled to run in the advertisement break a high, or the highest, score. As illustrated by block 290 the system can check to see whether unscheduled advertisements slots remain for the selected day and station. If spots remain the process can return to block 230 and if no spots remain the process can end. Underperforming contracts can be automatically corrected if they are not achieving the contractual level of GRP.

In some embodiments, scheduling can determine advertising campaigns that that are over-performing in accordance with their contract, where that GRP Estimated for the contract exceeds the contractual GRP by more than the tolerance percentage. In some embodiments, advertisements that are being scheduled for an over-performing GRP can be rescheduled, leaving open spots for use by underperforming campaigns such that underperformers can increase their GRP. Compensating for over performing contracts ensures that inventory is not wasted and more contractual requirements are fulfilled. The method described can be adapted to use impacts other than GRP.

The Airwaves system permits a user to specify a contractual GRP value for an advertising lay-down, the demographic, stations and month the lay-down is to occur in, and weightings that determine how advertisements are to be spread across week-days, week-ends and day-parts, and the system can automatically generate an advertising lay-down that achieves the contractual GRP value.

Figure 3:
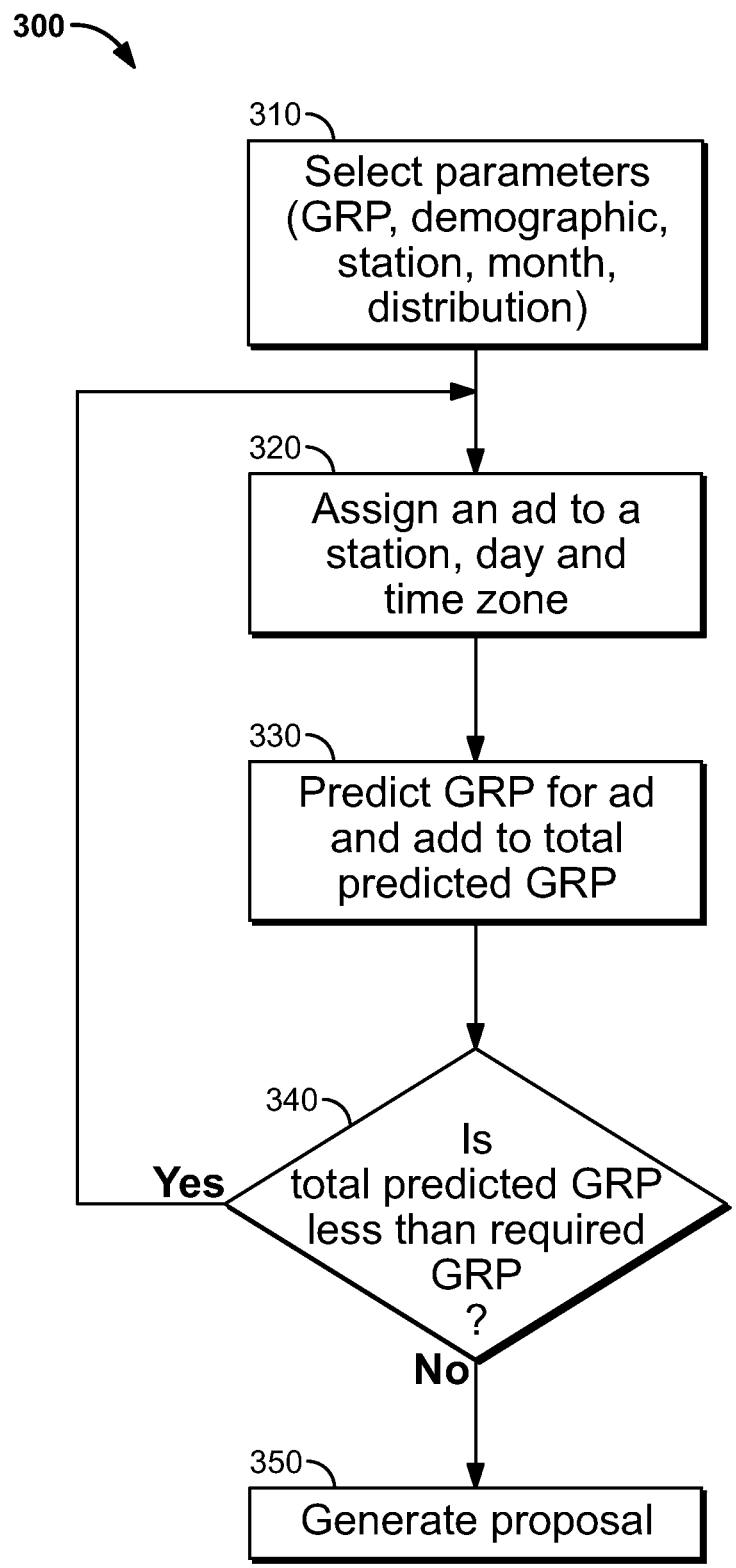
FIG. 3 is a flowchart illustrating an embodiment of a method for generating an advertising lay-down to achieve a contractual level of GRP is shown.

With reference now to FIG. 3, a method 300 for generating an advertising lay-down to achieve a desired level of GRP is shown.

As illustrated by block 310, the user can select parameters, including a total GRP desired for the proposal, the target demographic, the stations which will air the advertisements and the month (or other time period), day of week distribution and day part distribution in which the advertisements will run. In some embodiments the user can also select weightings that determine how advertisements are to be distributed across days of the week and times of the day. In some embodiments, there are two sets of weightings:

| Across days of the week: | |
|---|---|
| These weightings default to preset values: | |
| Weekday (Mon-Fri): | 76% |
| Weekend (Sat-Sun): | 24%; and |
| Across times of the day: | |

The weightings can be stored on day parts which are completely user definable. A typical set of day parts and weightings follows:

| Daytime (06:00:00-17:59:59) | 80% |
|---|---|
| Evening (18:00:00-21:59:59) | 11% |
| Late Night (22:00:00-23:59:59) | 2.25% |
| Early Morning (00:00:00-05:59:59) | 6.75% |

Based on these parameters and predicted GRP summary data a proposed advertising lay-down can be created as described below.

As illustrated by block 320, an advertisement can be randomly assigned to an available combination of station, day and time-zone (which in GRP selling can be a sub-set of a day-part). The random assignment can be weighted according to the weighting percentages described above. The random assignment can also takes into consideration remaining inventory so that advertisements can avoid being placed in areas of the day that have no available inventory. Time-zone can be defined as a time specific selling zone. Time-zone usually conforms to a day-part, although a user can set up time-zones that are subsets of or cross multiple day-parts As illustrated by block 330 the predicted GRP value can be computed for the advertisement assigned as illustrated by block 320. Such an assignment can be accomplished in accordance with the method described with references to FIG. 1.

The predicted GRP values for assigned advertisements can be summed into a Total Predicted GRP, which can be compared to the desired GRP value as illustrated by block 340. If the Total Predicted GRP is less than the contractual GRP value, the process can return to block 320 to assign another spot. Otherwise, as illustrated by block 350 the process can generate a proposal containing an advertising laydown that satisfies the total GRP contractual desires and the process can end thereafter.

The Airwaves Online software suite can be implemented as a web-based application that allows a user to enter a proposed advertising lay-down on a web-based form and with little time delay that user can see the predicted GRP of the proposed lay-down. The lay-down can be for a specific demographic and month and cover multiple radio stations.

Figure 4:
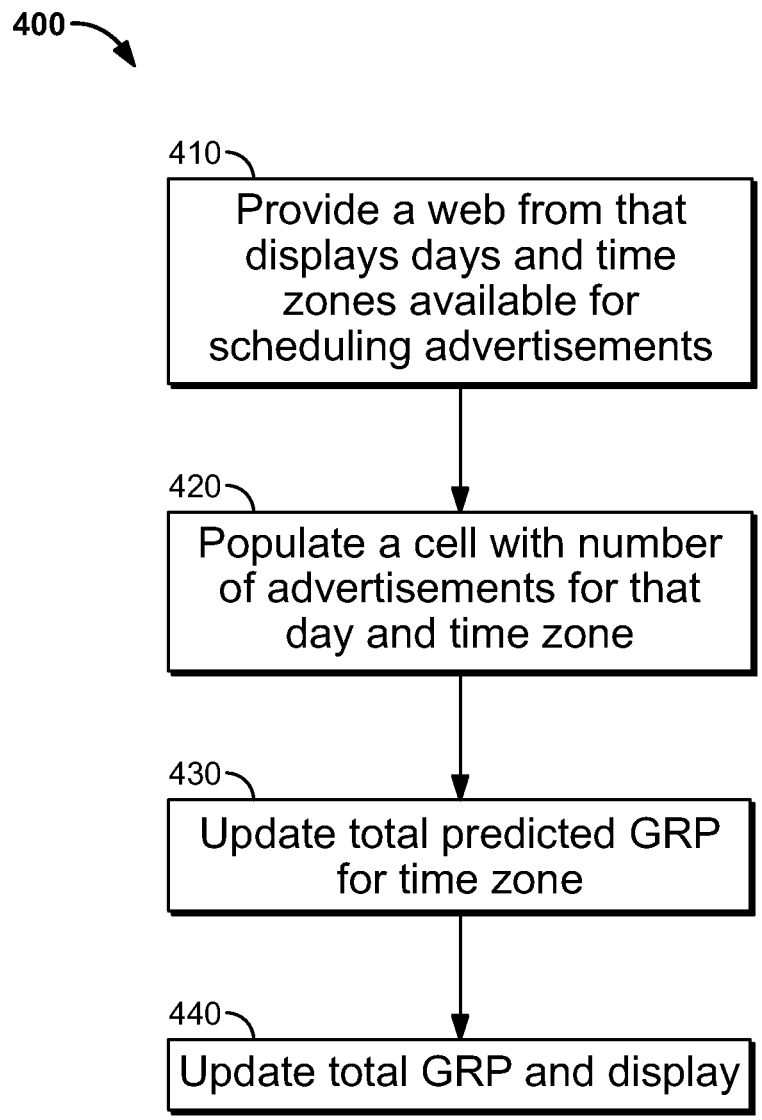
FIG. 4 is a flowchart illustrating an embodiment of a method for entering an advertising lay-down into a web browser and estimating the GRP to be achieved from this lay-down in real-time.

With reference now to FIG. 4, a method for entering an advertising lay-down into a web browser and for receiving an estimate on GRP based on the laydown in "real-time" is shown. As illustrated by block 410, a web page containing a web-form is provided, preferably by a web server. Referring briefly to FIG. 5 a web-based-form 500 is illustrated that could be utilized to enter an advertising lay-down into a web browser. The web-based form could also be utilized to provide an estimated GRP that corresponds to the lay-down that was entered by the user. Web-form 500 can correspond to a selected month and demographic and multiple media outlets or radio stations. Web-Form 500 can include row headings 520 corresponding to each time-zone, and column headings 510 corresponding to each day of the month. Web-based form 500 can also include columns which can provide a subtotal or entries for a particular time zone and for the entire month: column 530, can subtotal the number of spots per time-zone; column 540, can subtotals the advertising rate; and column 550, can subtotal the GRP for the time-zone across the entire month. Subtotal 570 can sum up all GRP values in column 550 to show the total predicted GRP for the entire proposed lay-down. The cell at the intersection of each row 520 and column 510 can refer to the advertising spots in a particular time-zone and day of the month.

Returning to FIG. 4, and as illustrated by block 420 a cell can be populated with a number corresponding to the number of advertisements that will run on the selected day and in the selected time-zone. The cell entry can be the number of advertisements to be placed for each station. Accordingly, if three stations are selected and a two is entered into the cell, six advertisements will be placed. The cell can be populated by a web server based on input provided by a user, preferably via conventional web-communication protocols such as HTTP and HTML over the Internet.

As illustrated by block 430, the GRP subtotal value in column 560 for all GRP values in the time zone selected by the user can be updated automatically in near real time to reflect the additional GRP provided by the proposed advertisements. As illustrated by block 440, the total GRP for the entire proposed lay-down can be updated automatically in near real time and displayed in cell 570.

In some embodiments, web-based-form 500 could have a selectable tab which could provide a GRP to be gained by placing a spot in a specified cell. The web-form shown 500 does not specifically illustrate what GRP is predicted by placing an advertisement in a specific cell. Additional tabs could enable a user to see which areas of the day are high-yielding GRP areas for a certain parameters. The web-form could also be adapted to use impacts or listener based data other than GRP.

Various disclosed embodiments can be implemented in hardware, software, or a combination containing both hardware and software elements. In one or more embodiments, the invention is implemented in software, which includes but is not limited to firmware, resident software, microcode, etc. Some embodiments may be realized as a computer program product, and may be implemented as a computer-usable or computer-readable medium embodying program code for use by, or in connection with, a computer, a processor, or other suitable instruction execution system.

By way of example, and not limitation, computer readable media may comprise any of various types of computer storage media, including volatile and non-volatile, removable and non-removable media implemented in any suitable method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer. Data structures and transmission of data (including wireless transmission) particular to aspects of the disclosure are also encompassed within the scope of the disclosure.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

What is claimed is:

1. A method for use in a device configured to implement an automated media content scheduling system, the device including a memory and a processor programmed to implement the method, the method comprising:
    obtaining a plurality of filtering criteria related to a consumer survey;
    storing, in memory, a plurality of historic data regarding historical listener data for a first set of parameters relating to an advertisement;
    filtering, using processing circuitry, the plurality of historic data based on the plurality of filtering criteria to generate a filtered set of historic data;
    generating, using the processing circuitry, a predicted gross rating point value for the advertisement for the first set of parameters based on filtered set of historic data;
    updating the plurality of historic data stored in the memory;
    generating, using the processor, an updated predicted gross rating point value in response to updating the plurality of historic data; and
    continually adjusting, using the processor, an advertising schedule to maintain the predicted gross rating point value between upper and lower boundary values.

2. The method of claim 1, wherein the plurality of filtering criteria comprises two demographic filtering criteria.

3. The method of claim 1, further comprising:
receiving user input relating to at least one consumer demographic; and
setting the plurality of filtering criteria based on the user input.

4. The method of claim 1, further comprising:
providing a web page displaying a plurality of day-time combinations according to selectable scheduling criteria;
displaying the predicted gross rating point value for advertisements scheduled to be run in respective ones of the plurality of day-time combinations;
adding one or more additional advertisements to one of the plurality of day-time combinations; and
updating the displayed prediction of advertising performance in response to the adding, the updating based on the predicted advertising performance of the one or more additional advertisements.

5. A computer readable medium tangibly embodying a program of computer executable instructions, the program of instructions comprising:
at least one instruction to specify a plurality of filtering criteria related to a consumer survey;
at least one instruction to store a plurality of historic data regarding gross rating points for a first set of parameters relating to an advertisement;
at least one instruction to filter the plurality of historic data based on the plurality of filtering criteria to generate a filtered set of historic data;
at least one instruction to generate a predicted gross rating point value for the advertisement for the first set of parameters based on filtered set of historic data;
at least one instruction to update the plurality of historic data;
at least one instruction to generate an updated predicted gross rating point value in response to updating the plurality of historic data; and
at least one instruction to continually adjust an advertising schedule to maintain the predicted gross rating point value between upper and lower boundary values.

6. The computer readable medium of claim 5, wherein the plurality of filtering criteria comprises two demographic filtering criteria.

7. The computer readable medium of claim 5, further comprising:
at least one instruction to receive user input relating to at least one consumer demographic; and
at least one instruction to set the plurality of filtering criteria based on the user input.

8. The computer readable medium of claim 5, further comprising:
at least one instruction to provide a web page displaying a plurality of day-time combinations according to selectable scheduling criteria;
at least one instruction to display the predicted gross rating point value for advertisements scheduled to be run in respective ones of the plurality of day-time combinations;
at least one instruction to add one or more additional advertisements to one of the plurality of day-time combinations; and
at least one instruction to update the displayed prediction of advertising performance in response to the adding, the updating based on the predicted advertising performance of the one or more additional advertisements.

9. A system comprising:
memory;
at least one processor operably coupled to said memory;
a program of computer readable instructions configured to be stored in the memory and executed by the processor, the program of instructions comprising:
at least one instruction to specify a plurality of filtering criteria related to a consumer survey;
at least one instruction to store a plurality of historic data regarding gross rating points for a first set of parameters relating to an advertisement;
at least one instruction to filter the plurality of historic data based on the plurality of filtering criteria to generate a filtered set of historic data;
at least one instruction to generate a predicted gross rating point value for the advertisement for the first set of parameters based on filtered set of historic data;
at least one instruction to update the plurality of historic data;
at least one instruction to generate an updated predicted gross rating point value in response to updating the plurality of historic data; and
at least one instruction to continually adjust an advertising schedule to maintain the predicted gross rating point value between upper and lower boundary values.

10. The system of claim 9, wherein the program of instructions further comprises:
at least one instruction to select a next advertisement to be scheduled;
at least one instruction to identify one or more valid advertisement breaks for the next advertisement;
at least one instruction to score each of the one or more valid advertisement breaks in accordance with the plurality of filtering criteria; and
at least one instruction to schedule the next advertisement in a valid advertisement break having a highest score if a contract associated with the next advertisement is underperforming, and to schedule the next advertisement in a valid advertisement break having a score other than the highest score if the contract associated with the next advertisement is not underperforming.

11. The system of claim 9, wherein the program of instructions further comprises:
at least one instruction to receive user input relating to at least one consumer demographic; and
at least one instruction to set the plurality of filtering criteria based on the user input.

12. The system of claim 9, wherein the program of instructions further comprises:
at least one instruction to provide a web page displaying a plurality of day-time combinations according to selectable scheduling criteria;
at least one instruction to display the predicted gross rating point value for advertisements scheduled to be run in respective ones of the plurality of day-time combinations;
at least one instruction to add one or more additional advertisements to one of the plurality of day-time combinations; and
at least one instruction to update the displayed prediction of advertising performance in response to the adding, the updating based on the predicted advertising performance of the one or more additional advertisements.

* * * * *